April 7, 1953
R. O. LUND
2,634,071
FIRE HOSE RACK
Filed Feb. 11, 1950
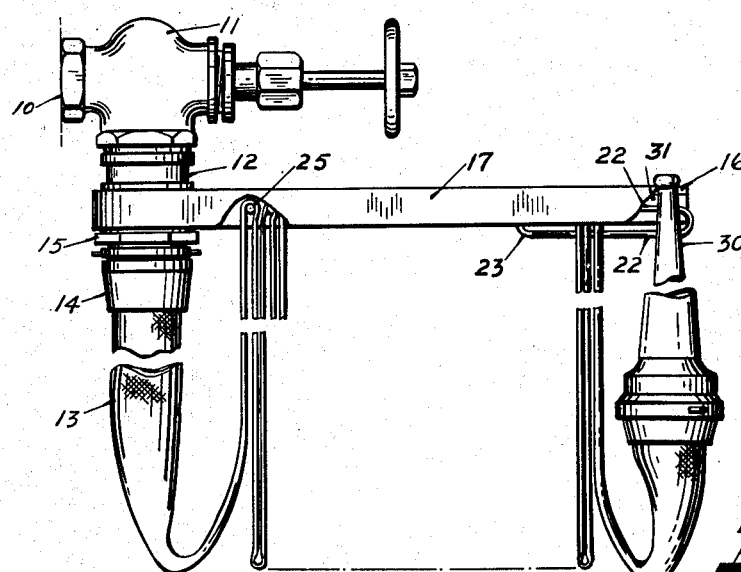
Fig. 1.
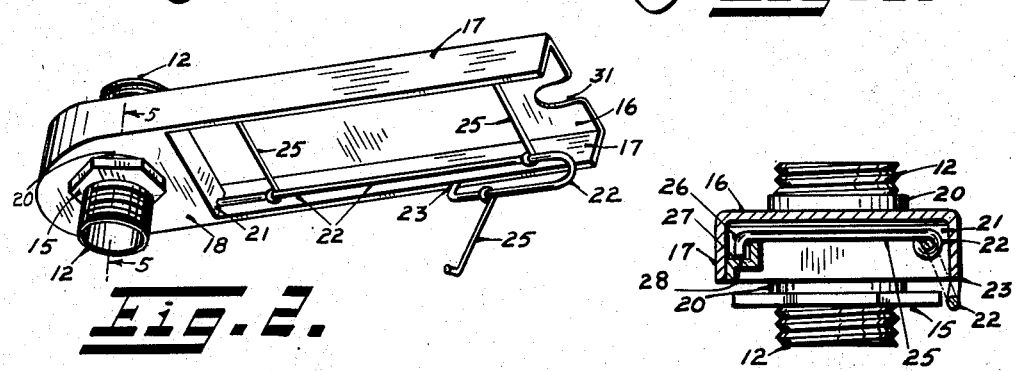
Fig. 2.
Fig. 4.
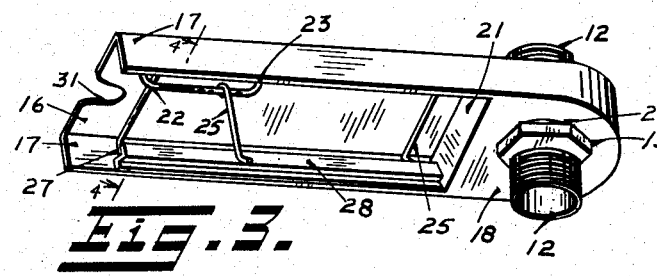
Fig. 3.
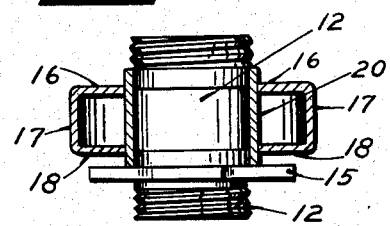
Fig. 5.
INVENTOR.
RUDOLPH O. LUND
BY
ATTORNEY Patented Apr. 7, 1953

2,634,071

UNITED STATES PATENT OFFICE 2,634,071

FIRE HOSE RACK

Rudolph O. Lund, Peekskill, N. Y.

Application February 11, 1950, Serial No. 143,730

3 Claims. (Cl. 248—92)

This invention relates to improvements in hose racks adapted to support a fire hose in the customary condition ready for instant release.

Such racks are known in which the loops of the hose are supported on pivoted pins whose free ends rest on a common member which can be disengaged therefrom to free the said loops all at once or seriatim; and others are known in which the said pins are disengageable from the common support member independently of one another.

Such constructions have, however, been found unsatisfactory in that the former often occasioned the dropping of the hose in a tangled heap and the latter due to the inclusion of blocking means normally to hold the pins engaged with their support often occasioned the snagging of a pin with the result that the unreeling process of the hose was delayed. And in both constructions the pins after being freed from their support sometimes piled up at one end of the rack and impeded the unreeling of the hose.

One object of the invention is the provision of a hose rack in which the hose is supported on pins pivoted on a longitudinal rod and having their free ends engaged in a longitudinal channel, whereby each pin is disengageable from the channel independently of the others without the possibility of snagging.

Another object of the invention is to curve the end of the pivot rod under itself to provide a sort of rack for the pins which have been disengaged from their support.

Still another object of the invention is the provision of simplified means for supporting the hose nozzle.

A still further object of the invention is to construct the hose rack so as to provide for the simple and inexpensive manufacture thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevation, partly broken away, of the improved rack showing a hose supported therein.

Fig. 2 is a perspective view of the rack from beneath with the hose removed.

Fig. 3 is a view similar to Fig. 2 but from a different vantage point.

Fig. 4 is a sectional view on line 4—4 of Fig. 3.

Fig. 5 is a sectional view on line 5—5 of Fig. 2.

The hose rack, according to the present invention is shown applied to a stand pipe 10 having an outlet valve 11 controlling the flow of water from the stand pipe through a union 12 to a hose 13 which is secured to the union by a coupling 14. A nut 15 is threaded on the union 12 and serves to support the metal frame of the hose rack. The metal frame comprises (Figs. 2 and 3) an inverted channel member having a top piece 16 and side walls 17. At the end engaging the union 12 the frame is rounded and is provided with an under piece 18 having therein a circular hole aligned with a like hole in the top piece 16. Secured in said holes and projecting above and below the frame is a sleeve 20 (Fig. 5) which embraces the union 12 and rests on the nut 15. It will be seen therefore that the frame is pivotally supported on the union 12 and nut 15.

The bottom piece 18 has bent up therefrom a partial wall or partition 21 which serves to support one end of a pivot rod 22 and also for another purpose to appear hereinafter. The pivot rod 22 extends longitudinally of the frame adjacent one of the walls 17 almost to the end of said wall where it is bent downward and under itself for a short distance to form a storage tank whose purpose will be explained hereinafter. The end of said rack is bent up as at 23 and is secured by welding to the lower edge of said wall 17.

A plurality of hose supporting pins 25 are pivoted on the rod 22, the ends thereof being looped about said rod (Fig. 4). The free ends of the support pins 25 are bent downward as at 26 to engage in a channel 27 formed by the opposite wall and a substantially Z-shaped bracket 28 secured longitudinally thereto. It is to be mentioned that whereas only a few pins 25 are illustrated in Figs. 2 and 3, a large number of said pins are utilized as can be understood from Fig. 1.

The construction is such that each pin 25 supports a loop of the hose 13 (Fig. 1) the first loop abutting the partition 21 and the nozzle 30 of the hose engaging for its support an open end slot 31 cut in the end of top piece 16. To remove the hose from the rack the nozzle 30 is disengaged and pulled away from the rack. As each pin 25 reaches the end of channel 27 the end 26 thereof drops free of the latter but is pushed by the weight of the hose onto the storage rack portion of the rod 22 before it becomes free of the hose entirely. Thus as each pin is freed it is moved out of the way of the next succeeding pin and will not conflict therewith. Further as many pins as desired can be disengaged from channel 27 without disturbing the remainder thereof.

It will be seen, therefore, that the rack of the invention is such that only as many loops of the hose as are required need be freed, and the freeing of said loops is done simply and efficiently without hitch.

The storage rack portion of the rod 22 is also useful when the hose is being replaced on the rack in that the pins are supported thereon in a very accessible position which, however, is such that the pins in no way interfere with the replacement of the hose.

While I have illustrated and described the preferred embodiment of my invention, it is to be understood that I do not limit myself to the precise construction herein disclosed and the right is reserved to all changes and modification coming within the scope of the invention as defined in the appended claims.

Having thus described my invention, what I claim as new and desire to secure by United States Letters Patent is:

1. A hose rack for pivotal mounting on a stand pipe, comprising an inverted channel member, a bottom cover for said channel member at one end thereof, said cover being turned up at its end to form a partial partition, aligned holes in said bottom cover and said channel member, a sleeve secured in said holes to be turnably mounted on the stand pipe, a pivot rod located within said channel member adjacent one wall thereof and having one end secured in said partition, the other end thereof being bent downward and under on itself to form a storage rack, the end of said storage rack being turned up and secured to the wall of the channel, a substantially Z-shaped bracket longitudinally secured to the other wall of the channel, and a plurality of hose supporting pins pivotally supported on said rod and each having its other end bent downward and engaging said substantially Z-shaped bracket.

2. A hose rack, comprising an inverted channel member, a bottom cover for said channel member at one end thereof, said cover being turned up at its end to form a partial partition, aligned holes in said bottom cover and said channel member, a sleeve secured in said holes for pivotally mounting said channel member on a fixed vertically extended support, a pivot rod located within said channel member adjacent one wall thereof and having one end secured in said partition, the other end thereof being bent downward under itself to form a storage rack, the end of said storage rack being turned up and secured to the wall of the channel, a substantially Z-shaped bracket longitudinally secured to the other wall of the channel, and a plurality of hose supporting pins pivotally supported at one of their ends on said rod and having their free ends engaging said substantially Z-shaped bracket normally, but on removing the hose becoming disengaged with the pivoted ends moving onto said storage rack.

3. A rack for a hose having a nozzle comprising an inverted channel member, a bottom cover for one end of said channel member, the end of said cover being turned upward into the channel to form a partial partition, aligned holes in said bottom cover and said channel member, a sleeve secured in said holes, a pivot rod located within said channel member adjacent one wall thereof and having one end secured in said partition, the other end thereof being bent downward and outward and back on itself to form a storage rack, the end of said rack being turned up and secured to the wall of the channel, a Z bracket longitudinally secured to the other wall of the channel, and a plurality of hose supporting pins each having a bent off end engaging said Z bracket.

RUDOLPH O. LUND.

REFERENCES CITED

The following references are of record in the file of this patent:

UNITED STATES PATENTS

| Number | Name | Date |
| --- | --- | --- |
| 527,128 | Regan | Oct. 9, 1894 |
| 618,655 | Field et al. | Jan. 31, 1899 |
| 980,217 | Dodge | Jan. 3, 1911 |
| 1,505,330 | Gibbs | Aug. 19, 1924 |
| 1,750,964 | Nuhring | Mar. 18, 1930 |
| 1,904,063 | Lund | Apr. 18, 1933 |
| 2,111,811 | Schichtel | Mar. 22, 1938 |